United States Patent
Enomoto (10) Patent No.: US 8,040,406 B2
(45) Date of Patent: Oct. 18, 2011

(54) METHOD OF PROCESSING IMAGES FROM AN IMAGING DEVICE

(75) Inventor: Jun Enomoto, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 707 days.

(21) Appl. No.: 12/053,561

(22) Filed: Mar. 22, 2008

(65) Prior Publication Data

US 2008/0231734 A1   Sep. 25, 2008

(30) Foreign Application Priority Data

Mar. 22, 2007   (JP) ................................. 2007-074403

(51) Int. Cl.
*H04N 9/64* (2006.01)
(52) U.S. Cl. ...................................................... 348/246
(58) Field of Classification Search ........................ None
See application file for complete search history.

(56) References Cited

U.S. PATENT DOCUMENTS

| | | | |
|---|---|---|---|
| 5,151,596 A | 9/1992 | Saotome | |
| 5,805,216 A * | 9/1998 | Tabei et al. ................... | 348/246 |
| 6,900,836 B2 * | 5/2005 | Hamilton, Jr. ................ | 348/241 |
| 7,203,279 B2 * | 4/2007 | Fujii et al. ..................... | 378/116 |
| 2001/0031098 A1 * | 10/2001 | Ford .............................. | 382/275 |
| 2006/0050158 A1 | 3/2006 | Irie | |
| 2007/0019847 A1 * | 1/2007 | Inoue et al. ................... | 382/128 |

FOREIGN PATENT DOCUMENTS

JP   3-279936 A   12/1991
JP   2006-060678 A   3/2006

* cited by examiner

*Primary Examiner* — Luong T Nguyen
(74) *Attorney, Agent, or Firm* — Sughrue Mion, PLLC (57) ABSTRACT

A method of processing images from an imaging device corrects defective pixels in an image acquired with the imaging device. The method includes a step of acquiring position information about continuous defective pixels from the position information about the defective pixels, a first correcting step of correcting the defective pixels with at least one normal pixel adjacent at least one defective pixels based on the position information about the defective pixels and a second correcting step of correcting the continuous defective pixels with a plurality of normal pixels adjacent at least one continuous defective pixels based on the position information about the continuous defective pixels. The second correcting step relies upon a greater number of normal pixels than the first correcting step to correct the defective pixels in a higher precision than the first correcting step.

17 Claims, 6 Drawing Sheets

METHOD OF PROCESSING IMAGES FROM AN IMAGING DEVICE

BACKGROUND OF THE INVENTION

The present invention relates to a method of processing images formed with an imaging device, more particularly, to a method of processing images formed with an imaging device by correcting defective pixels in the imaging device.

One of the methods for image acquisition is by using an imaging device that converts light to an electric signal.

Take, for example, an image scanner, facsimile, digital camera, or a video camera; the available method is to record image using a semiconductor light-receiving device (so-called "charge-coupled device," which is hereinafter sometimes referred to as "CCD") that converts light to an electric signal.

In other applications such as medical diagnostic imaging and industrial non-destructive testing, the available method is to record a radiation image by first allowing a radiation (e.g. X-rays, α-rays, β-rays, γ-rays, electron beams or uv rays) to pass through the object, causing it to be stored as a record in a storage phosphor sheet (so-called imaging plate), and reading the photostimulated luminescence that is emitted from the storage phosphor sheet.

Another method adopted in these applications such as medical diagnostic imaging and industrial non-destructive testing is to use a radiation image detector which records a radiation image by first allowing a radiation (e.g. X-rays, α-rays, β-rays, γ-rays, electron beams or uv rays) to pass through the object and then picking up the radiation as an electric signal.

An example of this radiation image detector is a device that employs a solid-state radiation detector (so-called "flat panel detector" which is hereinafter sometimes referred to as "FPD") that picks up the radiation as an electrical image signal.

FPDs are operated by one of two methods, direct and indirect; in the direct method, electron-positive hole pairs (e-h pairs) emitted from a film of photoconductive material such as amorphous selenium upon incidence of a radiation are collected and read as an electric signal, whereby the radiation is "directly" converted to an electric signal: in the indirect method, a phosphor layer (scintillator layer) which is formed of a phosphor that emits light (fluoresces) upon incidence of a radiation is provided such that it converts the radiation to visible light, which is read with a photoelectric transducer, whereby the radiation "as visible light" is converted to an electric signal.

The above-described image recording apparatus using the CCD or the radiation image recording apparatus using the FPD may suffer a deterioration in the quality of images and defective pixels in the CCD or FPD may be mentioned as one of the causes of such deterioration.

To be more specific, not all of the pixels (detecting elements) in the CCD or FPD will output a signal of the right intensity in response to the incident light or radiation (radiation dose) but there exist some pixels which output a signal of either abnormally low or abnormally high value in response to the light or radiation.

These areas (pixels) where defective pixels occur are unable to produce the right image. If the right image cannot be obtained on account of the defective pixels, an especial problem arises in the case where the produced image is to be used as a medical image since this can lead to such a serious trouble as wrong diagnosis.

Hence, in the radiation image recording apparatus, the positions of defective pixels are preliminarily detected on a specified timing and when the radiation image is to be recorded, the result of detection of the defective pixels is relied upon to perform defective pixel correction, in which pixels adjacent a defective pixel (or the relevant image data) are used to correct the defective pixels, and the radiation image that has been corrected for the defective pixels is displayed as the diagnostic image or the like, or reproduced as a print.

The following methods have been proposed with a view to correcting the image detects due to the above-described defects in the imaging device (see Patent Documents 1 and 2).

JP3-279936 A describes a radiation image display method characterized in that when a storage phosphor sheet in which a radiation image has been stored as a record is irradiated with exciting light and the resulting photostimulated luminescence that is emitted from the storage phosphor sheet is captured to obtain an image signal which is relied upon to display a visible image, a singular point position signal that represents the position of a singular point due to a defect on the surface or in the bulk of the storage phosphor sheet which appears in the radiation image that is carried by the image signal is entered, an interpolating operation is performed based on the image signals corresponding to pixels adjacent the singular point to thereby determine an interpolated image signal corresponding to the singular point, the interpolated signal is substituted for the image signal corresponding to the singular point, and a visible image is displayed based on the substituted image signal.

JP3-279936 A also describes one-dimensional interpolation that is performed as a method of correcting detective pixels.

JP2006-60678 A mainly relates to image processing as applicable to digital cameras and describes an imaging apparatus which, when a continuous shooting mode or a video shooting mode is set that requires high-speed image data processing which puts greater emphasis on speed than on image quality compared with a still image shooting mode for obtaining image data for still image, the image data corresponding to each of the defective pixels within the image data for the recorded image that have occurred at consecutive positions is subjected to a defective pixel correcting treatment based on the position information about the defective pixels that is loaded in a continuous defect correcting LUT 66A stored in a high-speed memory SRAM 66 whereas when a still image shooting mode that requires acquisition of image data of higher quality than in the continuous shooting mode or the video shooting mode is set, image data associated with the position information about all defective pixels within the image data for the recorded image is corrected based on two kinds of position information, one being the position information about the defective pixels that is loaded in an single defect correcting LUT 78A stored in memory SDRAM 78 which has a lower access speed than SRAM 66, and the other being the position information about the defective pixels that is loaded in continuous defect correcting LUT 66A stored in high-speed memory SRAM 66.

SUMMARY OF THE INVENTION

As described in JP3-279936 A, a defective pixel can be subjected to one-dimensional interpolation using normal pixels adjacent the defective pixel.

As described in JP2006-060678 A, high-speed processing can be realized by switching from one mode to another depending on the need and then selecting the defective pixels to be corrected.

However, as mentioned in JP2006-060678 A, if only those consecutive defective pixels which are easy to recognize are corrected, the presence of uncorrected defective pixels has made it impossible to form an image of high quality. In particular, still images for medical diagnosis are required to have even higher quality in order to ensure that they will not cause the above-mentioned problem of wrong diagnosis.

On the other hand, correcting each of the defective pixels in high precision with a view to obtaining a high-quality image will pose the problem of unduly prolonged image processing.

It is therefore an object of the present invention to provide a method of processing images from an imaging device that solves the above-mentioned problems of the prior art by correcting image defects in a shorter time and generating an image of higher quality at faster speed.

In order to attain the object described above, a first aspect of the present invention provides a method of processing images from an imaging device by correcting detective pixels in an image acquired with the imaging device, comprising: a position information acquiring step in which position information about continuous defective pixels is acquired from the position information about the defective pixels on the imaging device; a first correcting step in which the defective pixels are corrected with at least one normal pixel adjacent at least one defective pixels based on the position information about the defective pixels; and a second correcting step in which the continuous defective pixels are corrected with a plurality of normal pixels adjacent at least one continuous defective pixels based on the position information about the continuous defective pixels; wherein the second correcting step relies upon a greater number of normal pixels than the first correcting step to correct the defective pixels in a higher precision than the first correcting step.

Here, preferably, the position information acquiring step comprises: a map constructing step in which a map of the continuous defective pixels in the position information about the continuous defective pixels is constructed from the position information about the defective pixels; and a continuous defective pixels' position information acquiring step in which the map of the continuous defective pixels is read to acquire the position information about the continuous defective pixels from the map of the continuous defective pixels.

And, in order to attain the object described above, a second aspect of the present invention provides a method of processing images from an imaging device by correcting defective pixels in an image acquired with the imaging device, comprising: a position information acquiring step in which position information about continuous defective pixels and the position information about lone defective pixels are acquired from the position information about the detective pixels on the imaging device; a first correcting step in which the lone defective pixels are corrected with at least one normal pixel adjacent at least one lone defective pixel based on the position information about the lone defective pixels; and a second correcting step in which the continuous defective pixels are corrected with a plurality of normal pixels adjacent at least one continuous defective pixels based on the position information about the continuous defective pixels; wherein the second correcting step relies upon a greater number of normal pixels than the first correcting step to correct the defective pixels in a higher precision than the first correcting step.

In the second aspect of the present invention, preferably, the position information acquiring step acquires the position information about the lone defective pixels based on a difference between the position information about the defective pixels and the position information about the continuous defective pixels.

And, preferably, the position information acquiring step comprises: a continuous defect map constructing step in which a map of the continuous defective pixels in the position information about the continuous defective pixels is constructed from the position information about the defective pixels; a lone defect map constructing step in which a map of the lone defective pixels in the position information about the lone defective pixels is constructed from the position information about the defective pixels; a continuous defective pixels' position information acquiring step in which the map of the continuous defective pixels is read to acquire the position information about the continuous defective pixels from the map of the continuous defective pixels; and a lone defective pixels' position information acquiring step in which the map of the lone defective pixels is read to acquire the position information about the lone defective pixels from the map of the lone defective pixels.

Further, preferably, the lone defective pixels are a defective pixel that is adjacent to only normal pixels and a sequence of no more than three defective pixels.

And, preferably, the lone defective pixels are each a defective pixel that is adjacent to only normal pixels.

In addition, in the first and second aspects of the present invention, preferably, the position information about the defective pixels is position information about all defective pixels on the imaging device.

Also, the position information acquiring step preferably evaluates the position information about the defective pixels for continuity of the defective pixels and acquires the position information about the continuous defective pixels.

Moreover, the first correcting step preferably corrects the defective pixels by average value interpolation using N normal pixels adjacent to a defective pixel and the second correcting step corrects the defective pixels by weighted average interpolation using at least N+1 normal pixels adjacent to a defective pixel.

In addition, the imaging device is preferably a solid-state radiation detector.

And, it is preferable that the method further include a step of acquiring position information about the defective pixels on the imaging device.

According to the present invention, consecutive defective pixels that are easy to recognize by vision can be corrected in high precision by the second correcting step and, in addition, not-so-easy-to-recognize defective pixels are corrected by the first correcting step, thereby enabling the generation of a high-quality image. What is more, one mode of correction is switched to another and vice versa depending on the type of defective pixels to be corrected, whereby a high-quality image can be generated and yet the time taken by image processing can be shortened.

THE PREFERRED EMBODIMENTS OF THE INVENTION

The method according to the present invention for processing images formed with an imaging device is described below in detail based on the embodiments shown in the accompanying drawings.

Figure 1:
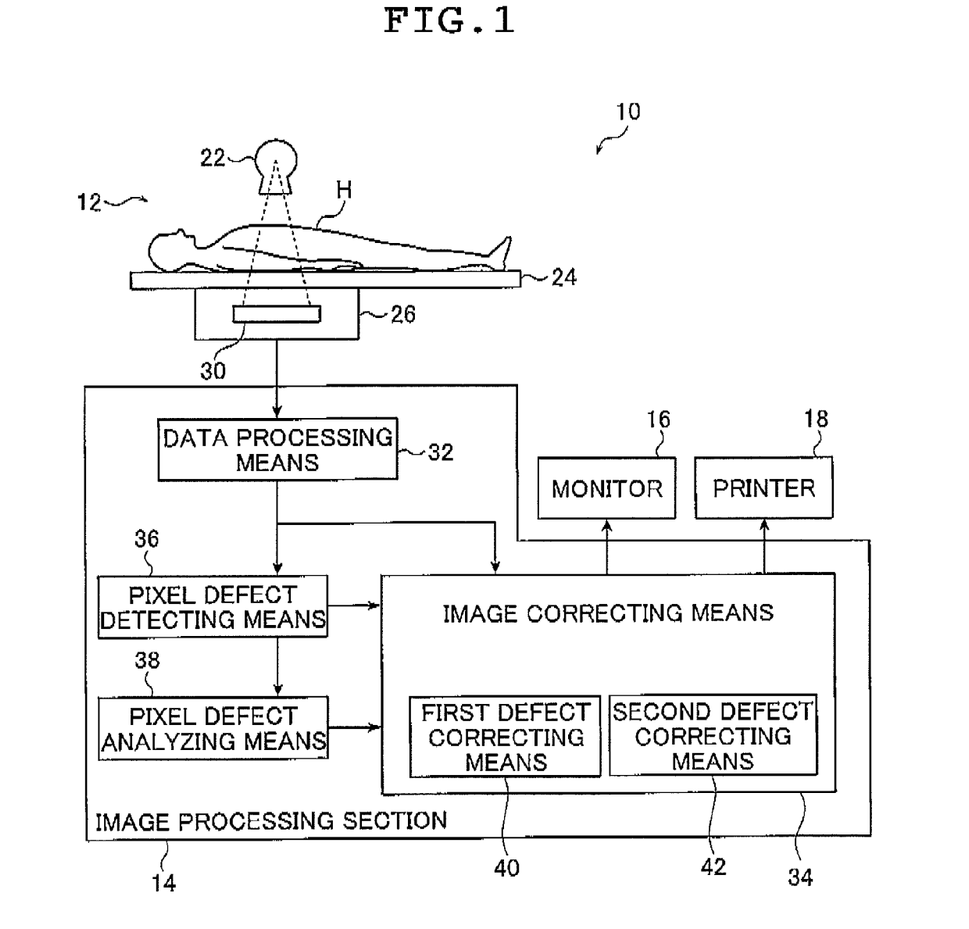
FIG. 1 is a block diagram showing a diagrammatic construction of a radiation image recording apparatus that uses the method of the present invention for processing images from an imaging device.

FIG. 1 is a block diagram showing a diagrammatic construction of a radiation imaging apparatus that uses the method of the present invention for processing images from an imaging device.

The radiation image recording apparatus indicated by 10 in FIG. 1 (which is hereinafter referred to as the "imaging apparatus 10") is one that records a radiation image which enables diagnostic imaging of a subject H (namely, the object); it comprises an imaging section 12 that records a radiation image, an image processing section 14 that processes the radiation image taken with the imaging section 12, a monitor 16, and a printer 18.

The imaging section 12 comprises a radiation source 22, an imaging platform 24, and an imaging means 26 and records a radiation image of subject H.

The radiation source 22 is a common radiation source that may be installed in a variety of radiation image recording apparatuses.

The imaging platform 24 is also a common imaging platform that may be employed with a variety of radiation image recording apparatuses.

It should be noted that the imaging apparatus 10 may optionally be equipped with a means of moving the radiation source 22, a means of ascending or descending the imaging platform 24, a means of moving it in the horizontal direction, a means of tilting the imaging platform 24, and the like.

The imaging means 26 has a solid-state radiation detector 30 (which is hereinafter referred to as "FPD 30") and records a radiation image on the FPD 30.

The imaging apparatus 10, like a common radiation image recording apparatus, receives the radiation on the receiving surface of the FPD 30 as it has emitted from the radiation source 22 and passed through the subject H and performs photoelectric conversion on that radiation so as to record the radiation image of the subject H.

In the present invention, the FPD 30 is a common FPD (flat panel detector) employed in radiation image recording apparatuses.

In the present invention, the FPD 30 may be one of the so-called direct type which uses a photoconductive film, typically made of amorphous selenium, and a TFT (thin film transistor) or the like and in which electron-hole pairs (e-h pairs) that have emitted from the photoconductive film in response to the incidence of a radiation are collected and read as an electric signal by means of the TFT, or it may be one of the so-called indirect type which uses a scintillator layer, typically made of CsI:Tl as a phosphor that emits light (fluoresces) in response to the incidence of a radiation, a photodiode and a TFT or the like and in which the luminescence from the scintillator layer in response to the incidence of a radiation is subjected to photoelectric conversion with the photodiode and read as an electric signal by means of the TFT.

In addition to the FPD 30, the imaging means 26 may of course be equipped with a grid as a shield from the scattering radiation that might be incident on the FPD 30, a means of moving the grid, or various other members that are used in known radiation image recording apparatuses.

An output signal for the radiation image recorded with the imaging means 26 (FFD 30) is delivered to the image processing section 14.

The image processing section 14 comprises a data processing means 32, an image correcting means 34, a defect detecting means 36, and a defect analyzing means 38, and processes the output signal from the FPD 30 to create image data that is associated with the display to be presented by the monitor 16, as well as image data that is associated with a print output from the printer 18, and even with the output of a radiation image (data) that is delivered over a network or on a recording medium.

The image processing section 14 may typically be composed of one or more computers or workstations and, in addition to the sites depicted in FIG. 1, it may have a keyboard, a mouse and the like for enabling a variety of manipulations, entering a variety of instructions, and the like.

The data processing means 32 performs A/D conversion, log conversion and other processes on the output signal from the FPD 30 such that it is converted to image data for the radiation image to be recorded.

The defect detecting means 36 (which is hereinafter referred to as the "detecting means 36") detects any defective pixel on the FPD 30.

The term "defective pixel" as used herein means a pixel (or a detecting device) that delivers an unduly high or low output signal with respect to the dose of incident radiation.

Figure 2A:
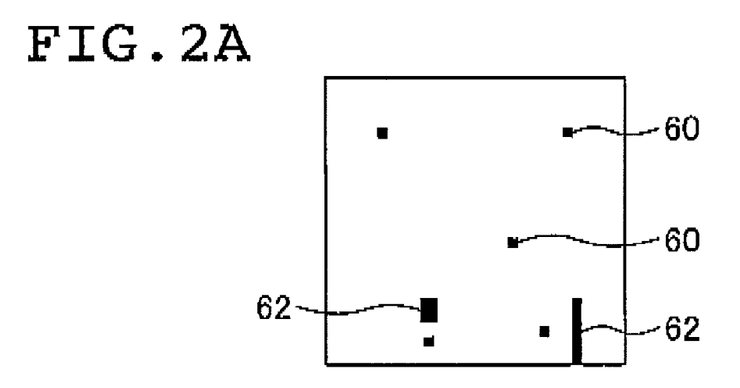
FIGS. 2A, 2B and 2C are schematic diagrams depicting exemplary defect maps.

The detecting means 36 detects defective pixels on the FPD 30 and constructs a defect map which, as depicted in FIG. 2A, shows the positions of all defective pixels (namely, the positions of pixels having a defect) that are found on the FPD 30. Hence, as is clear from FIG. 2A, the defect map shows the positions of both a lone defective pixel 60 and a continuous defective pixel 62 which are to be described later.

The detecting means 36 sends the constructed defect map to the image correcting means 34 and the defect analyzing means 38.

Note that the method of detecting defective pixels by the detecting means 36 is not limited in any particular way and all methods currently practiced with a variety of radiation image recording apparatuses to detect defective pixels may be employed, such as a detection method that uses a dark image (dark current), and a detection method that uses a radiation image obtained by uniform irradiation (exposure) of the FPD 30 with a specified amount of radiation from the radiation source 22 in the absence of the subject H.

The defect analyzing means 38 (which is hereinafter referred to as "analyzing means 38") detects continuous defective pixels 62 and lone defective pixels 60 from the defect map constructed by the detecting means 36 and constructs a continuous defective pixel map from the detected continuous defective pixels 62, as well as a lone defective pixel map from the detected lone defective pixels 60.

Specifically, the analyzing means 38 analyzes the defect map constructed by the detecting means 36 and detects continuous defective pixels 62 from the defective pixels. More specifically, the analyzing means 38 detects a sequence of at least a specified number of defective pixels in the defect map as a continuous defective pixel.

Figure 2B:
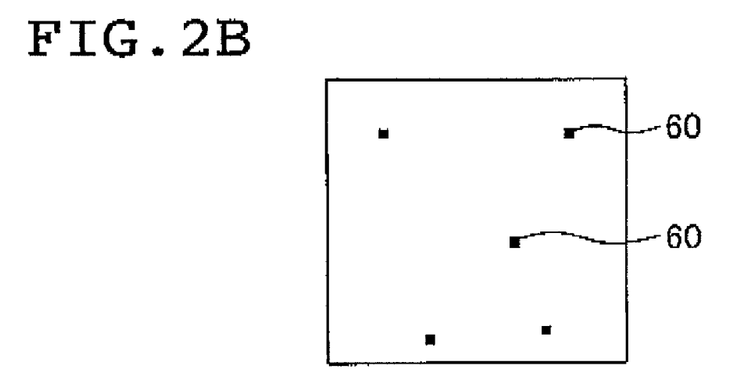
Figure 2C:
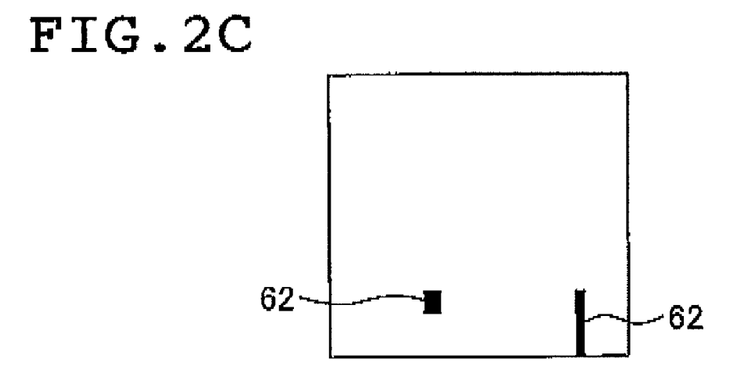

In the next step, the analyzing means 38 constructs a continuous defective pixel map showing the positions of the thus detected individual continuous defective pixels 62 (which map is hereinafter also referred to simply as a "continuous defect map") (see FIG. 2C). Note that the continuous defective pixel is a sequence of at least a specified number of defective pixels and the shape of the sequence is not limited in any particular way; as shown in FIG. 2C, both a linear sequence of a specified number of defective pixels and a two-dimensional sequence of a specified number of defective pixels crowded together may be defined as a continuous defective pixel.

Furthermore, the analyzing means 38 compares the defect map with the continuous defect map and detects the position information about the lone defective pixels 60 from the differential positions of all defective pixels and the continuous defective pixels 62. In other words, all defective pixels, except those which have not been detected as the continuous defective pixels 62, are detected as lone defective pixels 60.

The analyzing means 38 constructs a lone defective pixel map showing the positions of the thus detected lone defective pixels 60 (which map is hereinafter also referred to simply as a "lone defect map") (see FIG. 2B).

The analyzing means 38 transmits the thus constructed continuous defect map and lone defect map to the image correcting means 34.

The image correcting means 34 is one of performing image processing on the image data and comprises a first defect correcting means 40 that corrects the lone defective pixels 60 in accordance with the lone defect map constructed by the analyzing means 38, as well as a second defect correcting means 42 that corrects the continuous defective pixels 62 in accordance with the continuous defect map also constructed by the analyzing means 38. The image correcting means 34 performs a specified image processing scheme on the radiation image processed by the data processing section 32 (to be more exact, the image data for the radiation image) so as to create a radiation image that is associated with the image display to be presented by the monitor 16, as well as with a print (hard copy) output from the printer 18, and even with an output to a network or on a recording medium.

The first defect correcting means 40 bases on the lone defect map to correct the lone defective pixels 60 in the image data that has been processed by the data processing means 32. To state specifically, the first defect correcting means 40 acquires position information about the individual lone defective pixels from the lone defect map. Further in addition, the first defect correcting means 40 bases on the acquired position information about the lone defective pixels to specify the positions of those lone defective pixels and corrects each of the specified lone defective pixels 60 by the average value for two normal pixels adjacent to that lone defective pixel, for example, at opposite ends of such lone defective pixel.

The first defect correcting means 40 performs the same correction on all of the lone defective pixels shown in the lone defect map, to thereby correct the lone defective pixels on the image data.

The second defect correcting means 42 bases on the continuous defect map to correct the continuous defective pixels 62 on the image data that has been corrected for the lone defective pixels 60. To state specifically, the second defect correcting means 42 acquires position information about the individual continuous defective pixels from the continuous defect map. Further in addition, the second defect correcting means 42 bases on the acquired position information about the continuous defective pixels to specify the positions of those continuous defective pixels and corrects each of the specified continuous defective pixels 62 by the weighted average value as computed using at least three normal pixels adjacent that continuous defective pixel and the distance between each of these normal pixels and the continuous defective pixel.

Thus, the second defect correcting means 42 corrects the defective pixels with a higher precision than the first defect correcting means 40 by being based on a greater number of pixels than the latter.

The second defect correcting means 42 performs the same correction on all of the continuous defective pixels shown in the continuous defect map, to thereby correct the continuous defective pixels on the image data.

It should be noted here that the image processing to be carried out by the image correcting means 34 is by no means limited to the correction of defective pixels and it may be so designed as to perform not just the correction of defective pixels but also offset correction (dark correction) and gain correction (shading correction) which are effected in accordance with calibration, as well as gradation correction, density correction, and even data conversion which involves converting image data to data for monitor display or print output, and other image processing schemes that are performed in various radiation image recording apparatuses.

Described above is the basic construction of the radiation image recording apparatus 10 of the embodiment under consideration.

Figure 3:
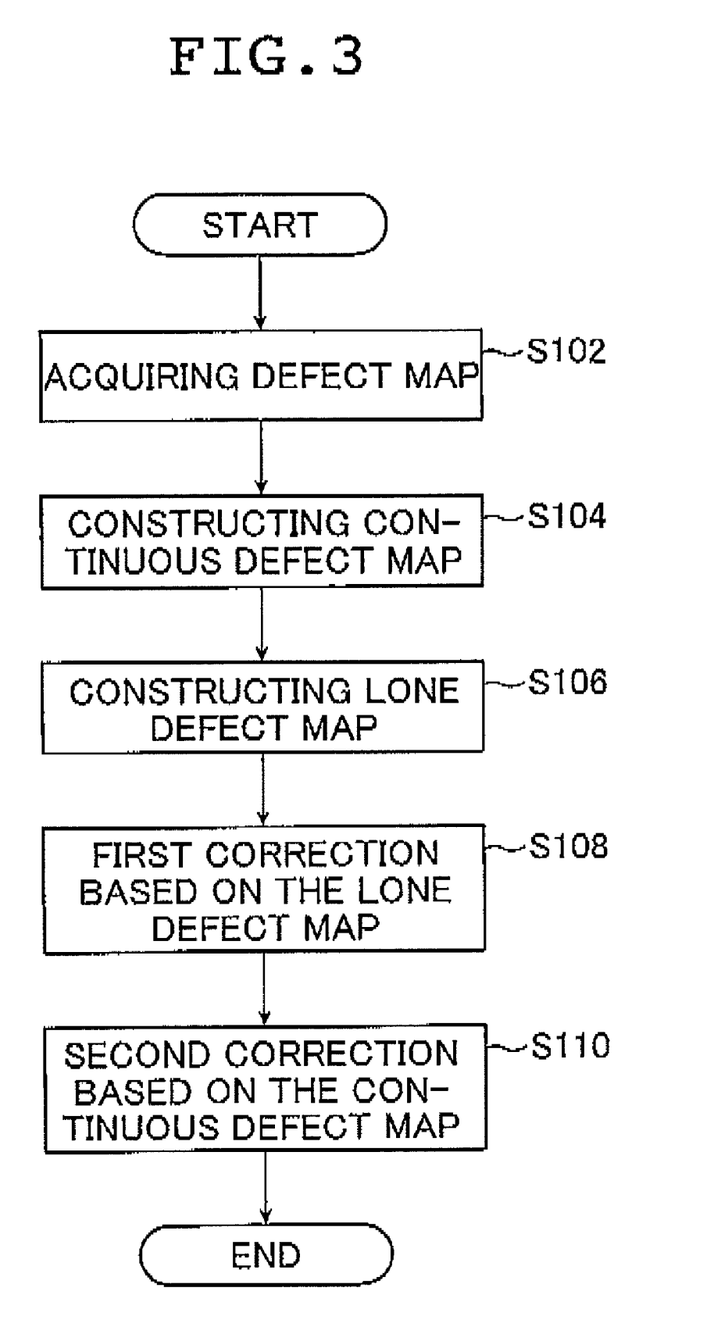
FIG. 3 is a flowchart illustrating an example of the method of the present invention for processing images from an imaging device.
Figure 4A:
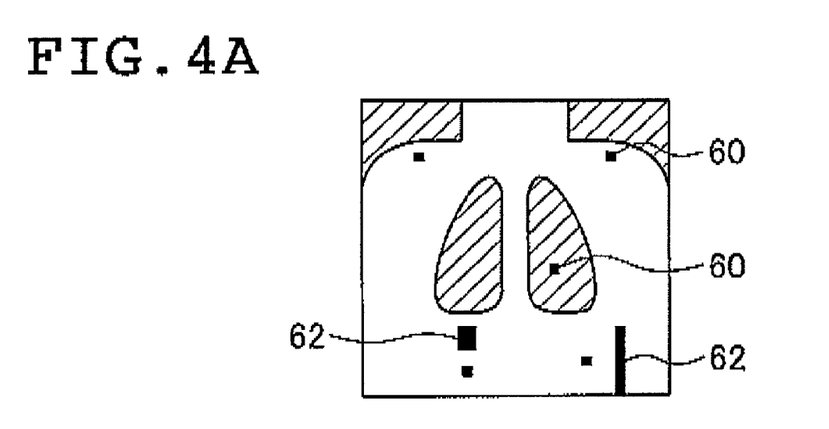
FIGS. 4A, 4B and 4C are schematic views showing image data as they relate to specific image processing steps that are shown in FIG. 3.
Figure 4B:
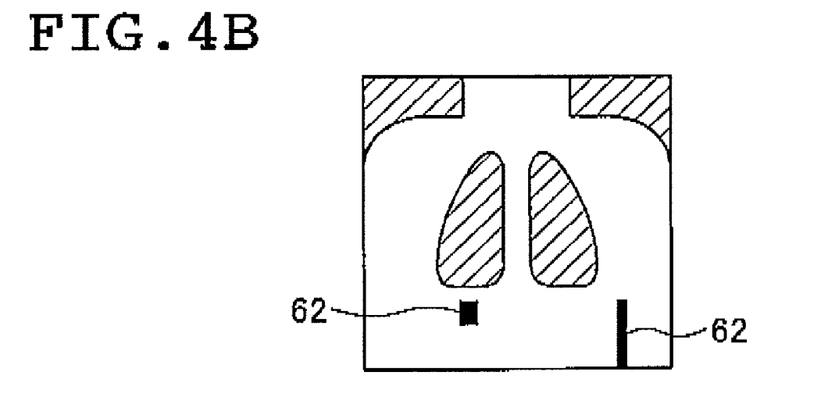
Figure 4C:
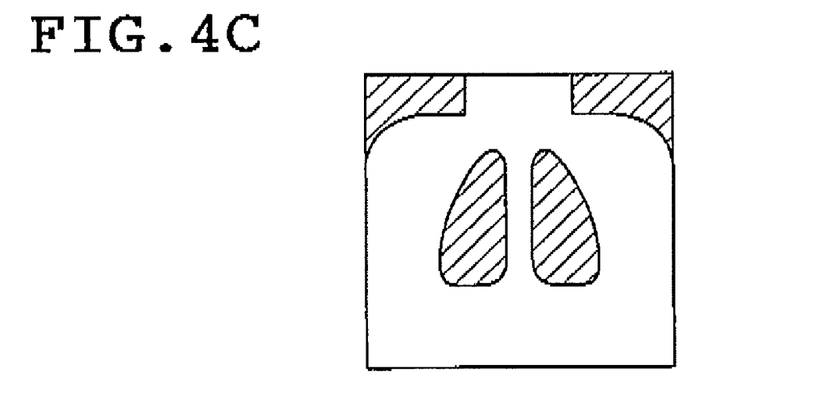

Hereinafter, the correction of defective pixels by the image processing section 14 is further explained on the basis of the flowchart in FIG. 3 and FIGS. 4A to 4C. FIGS. 4A to 4C are schematic views showing image data as they relate to specific image processing steps that are shown in FIG. 3

First, an image for detecting defective pixels is recorded by the imaging section 12 and sent to the data processing means 32 in the image processing section 14.

The data processing section 32 processes the image sent from the imaging section 12 so as to convert it to image data and then sends the obtained image data to the defect detecting section 36.

The defect detecting means 36 detects defective pixels from the image data sent from the data processing section and constructs a defect map showing the positions of the detected defective pixels (S102). The defect detecting means 36 sends the constructed defect map to the defect analyzing means 38.

From the defect map, the defect analyzing means 38 detects continuous defective pixels 62, each being a sequence of at least a specified number of adjacent defective pixels, and constructs a continuous defect map that shows the positions of the individual continuous defective pixels 62 (S104).

In the next step, all defective pixels, except the continuous defective pixels 62, are detected as lone defective pixels 60 by the defect analyzing means 38, which then constructs a lone defect map that shows the positions of the individual lone defective pixels 60 (S106).

This is how the continuous defect map and the lone defect map are constructed.

The defect analyzing means 38 sends the constructed continuous defect map and lone defect map to the image correcting means 34.

In the next step, a radiation image of a subject H is taken by the imaging section 12 and sent to the image processing section 14.

The data processing means 32 in the image processing section 14 converts the recorded radiation image to image data and sends it to the image correcting means 34. As shown in FIG. 4A, the image data sent to the image correcting means 34 is one having defective pixels (namely, the lone defective pixels 60 and the continuous defective pixels 62).

In the next step, the first defect correcting means 40 in the image correcting means 34 acquires the lone defect position information from the lone defect map and, using the acquired lone defect position information, corrects the lone defective pixels on the image data sent from the image correcting means 34 (S108). As shown in FIG. 4B, the image data corrected for the lone defective pixels 60 is such that the lone defective pixels 60 that are isolated from the other defective pixels and which are not easy to recognize by vision have been corrected to ensure that the continuous defective pixels 62 are the only defective pixels that are left on the image data.

In the next step, the second defect correcting means 42 in the image correcting means 34 acquires the continuous defect position information from the continuous defect map and, using the acquired continuous defect position information, corrects the continuous defective pixels 62 on the image data that has been corrected for the lone defective pixels 60 by the first defect correcting means 40 (S110). The image data corrected for the continuous defective pixels 62 is such that all defective pixels have been corrected as shown in FIG. 4C.

After performing additional image processing schemes including offset correction, gain correction, gradation correction, density correction, etc., the image correcting means 34 sends the image data to the monitor 16 and/or the printer 18 for either displaying or outputting an image.

Thus, by using two kinds of maps and correcting the lone defective pixels and the continuous defective pixels under different image conditions, namely, by correcting the easy-to-recognize continuous defective pixels with a higher precision than the lone defective pixels on the basis of a greater number of normal pixels, correction can be accomplished in accordance with the specific type of defective pixels.

As a result, the not-so-easy-to-recognize lone defective pixels are corrected with a lower precision to enable the shortening of the time it takes to perform overall image processing. In contrast, the easy-to-recognize continuous defective pixels are corrected with a higher precision to enable the production of a high-quality image.

Consequently, the quality of the image data can be maintained and yet the time it takes to perform overall image processing can be shortened.

It should be noted here that the continuous defect map and the lone defect map need not be constructed each time the image data is corrected but it is preferred to use a continuous defect map and a lone defect map that have been constructed at the time the apparatus is started up, at any desired interval such as a cyclic period, or after a predetermined number of images have been recorded.

To be more specific, the procedure comprising the above-described steps of acquiring the defect map, constructing the continuous defect map and constructing the lone defect map (S102, S104, and S106 in FIG. 3) may be adopted in all instances of correcting defective pixels such that the steps of correcting defective pixels by the first defect correcting means 40 and the second defect correcting means 42 (S108 and S110 in FIG. 3) are followed repeatedly.

By thusly correcting the defective pixels using preliminarily constructed (stored in memory) continuous and lone defect maps, the operator can shorten the time it takes to perform overall image processing.

The timings on which the defect map, the continuous defect map and the lone defect map are constructed (or updated) are not limited in any particular way and they may be the same as those adopted in various radiation image recording apparatuses, as exemplified by the time after starting up the imaging apparatus 10, each time a predetermined number of images have been taken, each time a predetermined time has lapsed, each time a predetermined dose of radiation has been irradiated from the radiation source 22, and suitable combinations of these timings.

In the embodiment described above, the lone defective pixels are detected by subtracting the continuous defective pixels from all defective pixels, specifically, from the difference between the defect map and the continuous defect map; however, this is not the sole case of the present invention and those defective pixels which satisfy a certain condition may be detected as lone defective pixels independently of the continuous defective pixels.

Alternatively, some of the defective pixels may be detected as both continuous defective pixels and lone defective pixels although this increases the time it takes to perform overall image processing.

Furthermore, the definition of the continuous defective pixel is not limited in any particular way and it may be defined as at least two consecutive defective pixels (namely, a sequence of at least two defective pixels) or, alternatively, as a sequence of at least a specified number of (say, at least four) defective pixels.

The definition of the lone defective pixel is also not limited in any particular way and it may be defined as a single independent defective pixel (namely, a defective pixel that is adjacent to only normal pixels; in other words, a pixel such that all pixels adjacent to it are normal pixels) or, alternatively, as a single independent defective pixel plus no more than a predetermined number of consecutive defective pixels (namely, a sequence of no more than a predetermined number of defective pixels).

In the present invention, a detective pixel that is adjacent to only normal pixels and a sequence of no more than three defective pixels are preferably dealt with as lone defective pixels, and more preferably, only a defective pixel that is adjacent to only normal pixels is dealt with as a lone defective pixel.

If a sequence of no more than three defective pixels is dealt with as a lone defective pixel, defective pixels can be corrected advantageously through the correction by the first correcting means; if a defective pixel that is adjacent to only normal pixels is dealt with as a lone defective pixel, defective pixels can be corrected more advantageously through the correction by the first correcting means.

It should be noted here that all defective pixels have to be defined in such a way that they are detected either as a continuous defective pixel or as a lone defective pixel or as both. By this way of definition, all defective pixels can be corrected.

The definition of the continuous defective pixel and/or the lone defective pixel, namely, the threshold for determining whether a defective pixel should or should not be detected as a continuous defective pixel and/or a lone defective pixel is preferably of such a design that it can be set by the user.

By thusly making the definition of the continuous defective pixel and/or the lone defective pixel variable, the defective pixels on the image data can be corrected in accordance with the desired image quality and processing speed.

In the embodiment described above, a map showing only the position information about the defective pixels is used as each of the lone defect map and the continuous defect map, and the first defect correcting means 40 and the second defect correcting means 42 in the process of correcting defective pixels are based on the position information about the defective pixels to compute the normal pixels to be used in defect correction, whereby the defective pixels are corrected. By thusly constructing a map for each of the lone and continuous defects in advance that shows the position information about the individual defective pixels, the need to detect defective pixels each time they are to be corrected is eliminated, thereby ensuring that the defective pixels can be corrected in a short enough time.

Using the above-mentioned map is sufficient to correct the defective pixels but the map to be used as the lone defect map and/or the continuous defect map preferably contains not only the position information about the defective pixels but also the position information about the normal pixels that are to be used for correcting the defective pixels.

If a map that has the normal pixels for use in defective pixel correction computed and stored preliminarily is used as the lone defect map and/or the continuous defect map, there is no need to perform calculation in the process of defective pixel correction based on the position information about the defective pixels but the information in the map alone is sufficient to specify the normal pixels for use in the correction (namely, the positions of such normal pixels).

As the result, the need to compute the positions of the normal pixels for use in defective pixel correction based on the position information about the defective pixels on the image data each time they are to be corrected is eliminated, thereby ensuring that the defective pixels can be corrected in an even shorter time.

In the case just described above, the first defect correcting means 40 preferably corrects the defective pixels by average value interpolation, which technique performs correction using the average value for N normal pixels adjacent a particular defective pixel, and the second defect correcting means 42 preferably corrects the defective pixels by weighted average value interpolation, which technique performs correction based on at least N+1 normal pixels adjacent a particular defective pixel and the distance of each of such normal pixels from the defective pixel.

By employing the average value interpolation on N normal values in the process of correction by the first defect correcting means 40 and by employing the weighted average value interpolation on at least N+1 normal pixels in the process of correction by the second defect correcting means 42, the defective pixels can be corrected in an even shorter time and in a positive way.

It should be noted here that the method by which the two defect correcting means correct the defective pixels is not limited in any particular way, provided that the second defect correcting means should be capable of more precise defective pixel correction than the first defect correcting means; in addition to the method employed in the embodiment described above, in which the average for two normal pixels at opposite ends of, or opposite sides adjacent to a particular detective pixel or more than two normal pixels adjacent thereto is used as data for that defective pixel, one may employ the method of generating data for a particular defective pixel from the tendency of the change in the pixels in a specified region neighboring that defective pixel, as well as other methods of defective pixel correction that are currently practiced in a variety of radiation image recording apparatuses.

If the same method of correction is adopted but the second defect correcting means is adapted to correct detective pixels based on a greater number of normal pixels than the first defect correcting means, the second defect correcting means is capable of more precise defective pixel correction than the first defect correcting means.

In the foregoing embodiment, the lone defect map is used in the first defect correcting means 40 but this is not the sole case of the present invention and the defect map may be substituted for the lone defect map.

In short, the defect map may be used in the first defect correcting means 40 to correct all defective pixels but the continuous defect map is used in the second defect correcting means 42 to correct the continuous defective pixels.

Figure 5:
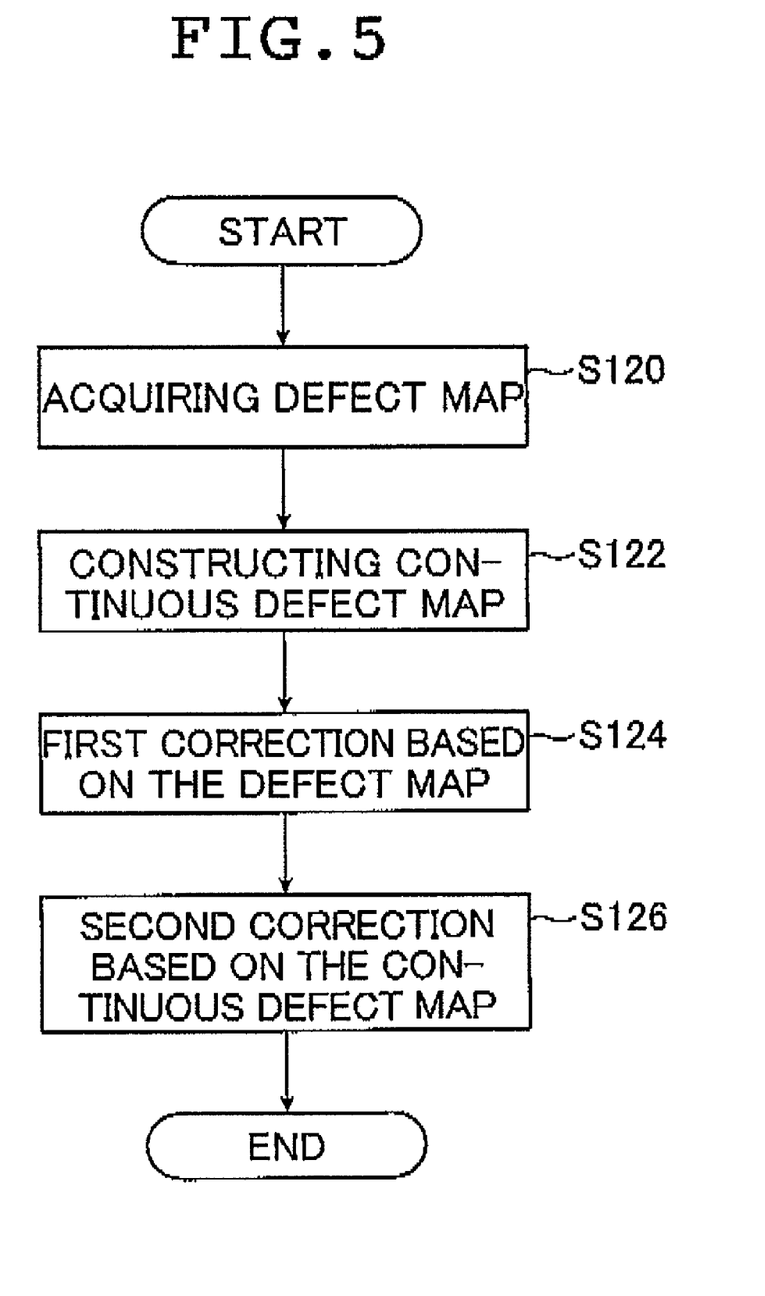
FIG. 5 is a flowchart illustrating another example of the method of the present invention for processing images from an imaging device.
Figure 6A:
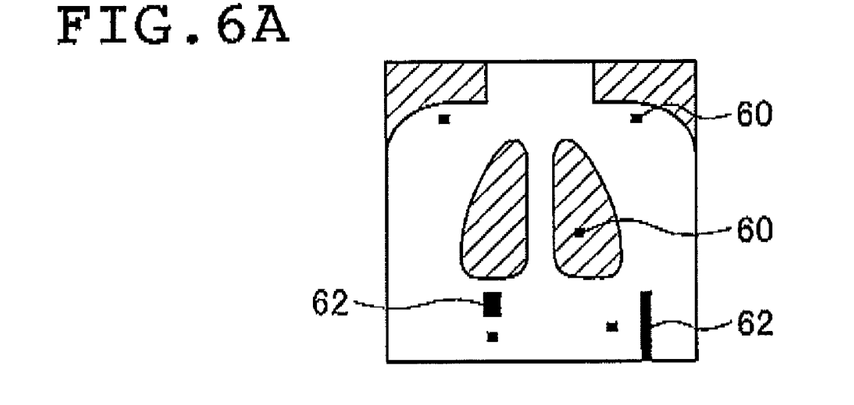
FIGS. 6A, 6B and 6C are schematic views showing image data as they relate to specific image processing steps that are shown in FIG. 5.
Figure 6B:
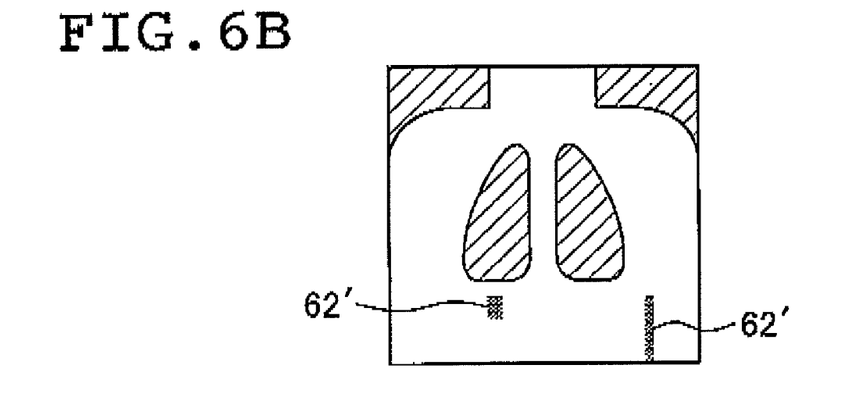

Hereinafter, another example of the correction of defective pixels by the image processing section 14, namely, another example of the method of the present invention for processing images from an imaging device, is explained on the basis of the flowchart in FIG. 5 and FIG. 6. FIGS. 6A to 6C are schematic views showing image data as they relate to specific image processing steps that are shown in FIG. 5.

First, an image for detecting defective pixels is recorded by the imaging section 12 and sent to the data processing means 32 in the image processing section 14.

The data processing section 32 processes the image sent from the imaging section 12 so as to convert it to image data and then sends the obtained image data to the defect detecting section 36.

The defect detecting means 36 detects defective pixels from the image data sent from the data processing section and constructs a defect map showing the positions of the detected defective pixels (S120). The defect detecting means 36 sends the constructed defect map to the image correcting means 34 and the defect analyzing means 38.

From the defect map, the defect analyzing means 38 detects continuous defective pixels, each being a sequence of at least a specified number of adjacent defective pixels, and constructs a continuous defect map that shows the positions of the individual continuous defective pixels (S122). The defect analyzing means 38 sends the constructed continuous defect map to the image correcting means 34.

In the next step, a radiation image of a subject H is taken by the imaging section 12 and sent to the image processing section 14.

The data processing means 32 in the image processing section 14 converts the recorded radiation image to image data and sends it to the image correcting means 34. As shown in FIG. 6A, the image data sent to the image correcting means 34 is one having defective pixels (namely, the lone defective pixels 60 and the continuous defective pixels 62).

In the next step, the first defect correcting means 40 in the image correcting means 34 acquires the position information about all defective pixels from the defect map and, using the acquired defective pixels' position information, corrects the defective pixels on the image data from the image correcting means 34 by the average value of the adjacent normal pixels (S124). As shown in FIG. 6B, the image data corrected for the defective pixels by the first defect correcting means 40 is such that the continuous defective pixels 62' remain recognizable by vision but the lone defective pixels have been corrected to such an extent that they are indistinguishable from the normal pixels.

In the next step, the second defect correcting means 42 in the image correcting means 34 acquires the continuous defective pixels' position information from the continuous defect map and, using the acquired continuous defective pixels' position information, corrects the continuous defective pixels 62 on the image data that has been corrected for the defective pixels by the first defect correcting means 40 (S126). As in the first embodiment, the second defect correcting means 42 corrects the defective pixels in a higher precision than the first defect correcting means.

Figure 6C:
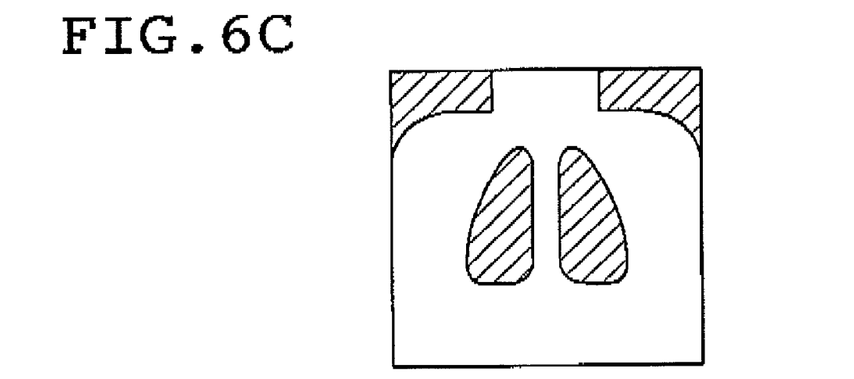

The image data corrected for the continuous defective pixels is such that all defective pixels have been corrected as shown in FIG. 6C.

After performing additional image processing schemes including offset correction, gain correction, gradation correction, density correction, etc., the image correcting means 34 sends the image data to the monitor 16 and/or the printer 18 for either displaying or outputting the image.

As in the first embodiment, the continuous defective pixels are corrected for the defect twice in the embodiment under consideration; however, not all defective pixels need be subjected to highly precise correction and yet an image of high quality can be produced. In addition, by subjecting the easy-to-recognize continuous defective pixels to highly precise correction, all defective pixels suffice to be corrected with a lower precision, thereby enabling the shortening of the time it takes to perform overall image processing.

As the result, a high-quality image can be produced in a shorter time.

As in the first embodiment, the defect map and the continuous defect map may each be a map that shows only the position information about the defective pixels but it is preferred to use a map that contains not only the information about the defective pixels but also the position information about the normal pixels that are to be used for correcting the defective pixels.

The description of the foregoing embodiments assumes that the method of the present invention for processing images from an imaging device is applied to a radiation image recording apparatus that uses an FPD as the imaging device since this assures the beneficial effects of the present invention to be brought about in a more advantageous way. However, this is not the sole case of the present invention and it may be applied to an image recording apparatus that uses a CCD as an imaging device or to one that uses imaging plates. Note that when the present invention is applied to an image recording apparatus that uses imaging plates, defect detection has to be performed for each imaging plate.

While the method according to the present invention for processing images from an imaging device have been described above in detail, it should be understood that the present invention is by no means limited to the foregoing embodiments and that various improvements and modifications can be made without departing from the scope and spirit of the present invention.

For example, in each of the foregoing embodiments, defective pixels are corrected by the first defect correcting means and the second defect correcting means in that order; however, this is not the sole case of the present invention and the order may be reversed in such a way that defective pixels are first corrected by the second defect correcting means, then by the first defect correcting means.

To be more specific, the continuous defective pixels may be first corrected in high precision and, thereafter, all defective pixels or the lone defective pixels are corrected.

In addition, if a preview image is to be presented on the monitor, it may be an image that has been corrected for the defective pixels by either the first defect correcting means or the second defect correcting means alone.

As the result, a preview can be presented in an even shorter time.

In each of the foregoing embodiments, the continuous defect map and/or the lone defect map is constructed from the defect map but this is not the sole case of the present invention and the following alternative that takes for longer to perform image processing but which eliminates the construction of maps may be adopted: the second defect correcting means detects continuous defective pixels and bases on the result of this detection to correct the continuous defective pixels whereas the first defect correcting means detects lone defective pixels and bases on the result of this detection to correct the lone defective pixels.

In other words, the first and second defect correcting means may simultaneously be engaged in detecting the defective pixels of interest from all defective pixels and correcting the detected defective pixels.

What is claimed is:

1. A method of processing images from an imaging device by correcting defective pixels in an image acquired with said imaging device, comprising:
    a position information acquiring step in which position information about continuous defective pixels is acquired from position information about said defective pixels on said imaging device;
    a first correcting step in which said defective pixels are corrected with at least one normal pixel adjacent at least one defective pixel based on the position information about said defective pixels; and
    a second correcting step in which said continuous defective pixels are corrected with a plurality of normal pixels adjacent at least one continuous defective pixel based on the position information about said continuous defective pixels;
    wherein said second correcting step relies upon a greater number of normal pixels than said first correcting step to correct said defective pixels in a higher precision than said first correcting step.

2. The method according to claim 1, wherein said position information acquiring step comprises:
    a map constructing step in which a map of said continuous defective pixels in the position information about said continuous defective pixels is constructed from the position information about said defective pixels; and
    a continuous defective pixels' position information acquiring step in which said map of said continuous defective pixels is read to acquire the position information about said continuous defective pixels from said map of said continuous defective pixels.

3. A method of processing images from an imaging device by correcting defective pixels in an image acquired with said imaging device, comprising:
    a position information acquiring step in which position information about continuous defective pixels and position information about lone detective pixels are acquired from position information about said defective pixels on said imaging device;
    a first correcting step in which said lone defective pixels are corrected with at least one normal pixel adjacent at least one lone defective pixel based on the position information about said lone defective pixels; and
    a second correcting step in which said continuous defective pixels are corrected with a plurality of normal pixels adjacent at least one continuous defective pixel based on the position information about said continuous defective pixels;
    wherein said second correcting step relies upon a greater number of normal pixels than said first correcting step to correct said defective pixels in a higher precision than said first correcting step.

4. The method according to claim 3, wherein said position information acquiring step acquires the position information about said lone defective pixels based on a difference between the position information about said defective pixels and the position information about said continuous defective pixels.

5. The method according to claim 3, wherein said position information acquiring step comprises:

a continuous defect map constructing step in which a map of said continuous defective pixels in the position information about said continuous defective pixels is constructed from the position information about said defective pixels;

a lone defect map constructing step in which a map of said lone defective pixels in the position information about said lone defective pixels is constructed from the position information about said defective pixels;

a continuous defective pixels' position information acquiring step in which said map of said continuous defective pixels is read to acquire the position information about said continuous defective pixels from said map of said continuous defective pixels; and a lone defective pixels' position information acquiring step in which said map of said lone defective pixels is read to acquire the position information about said lone defective pixels from said map of said lone defective pixels.

6. The method according to claim 3, wherein said lone defective pixels are defective pixels that are adjacent to only normal pixels and a sequence of no more than three defective pixels.

7. The method according to claim 3, wherein each of said lone defective pixel is a defective pixel that is adjacent to only normal pixels.

8. The method according to claim 3, wherein the position information about said defective pixels is position information about all defective pixels on said imaging device.

9. The method according to claim 3, wherein said position information acquiring step evaluates the position information about said defective pixels for continuity of said defective pixels and acquires the position information about said continuous defective pixels.

10. The method according to claim 3, wherein
said first correcting step corrects said defective pixels by average value interpolation using N normal pixels adjacent to a defective pixel and
said second correcting step corrects said defective pixels by weighted average interpolation using at least N+1 normal pixels adjacent to the defective pixel.

11. The method according to claim 3, wherein said imaging device is a solid-state radiation detector.

12. The method according to claim 3, further including a step of acquiring the position information about said defective pixels on said imaging device.

13. The method according to claim 1, wherein the position information about said defective pixels is position information about all defective pixels on said imaging device.

14. The method according to claim 1, wherein said position information acquiring step evaluates the position information about said defective pixels for continuity of said defective pixels and acquires the position information about said continuous defective pixels.

15. The method according to claim 1, wherein
said first correcting step corrects said defective pixels by average value interpolation using N normal pixels adjacent to a defective pixel and
said second correcting step corrects said defective pixels by weighted average interpolation using at least N+1 normal pixels adjacent to the defective pixel.

16. The method according to claim 1, wherein said imaging device is a solid-state radiation detector.

17. The method according to claim 1, further including a step of acquiring the position information about said defective pixels on said imaging device.

* * * * *